United States Patent [19]

Young

[11] 4,066,841

[45] Jan. 3, 1978

[54] DATA TRANSMITTING SYSTEMS

[75] Inventor: Robert Eric Young, Leamington Spa, England

[73] Assignee: Serck Industries Limited, Leamington Spa, England

[21] Appl. No.: 726,323

[22] Filed: Sept. 24, 1976

Related U.S. Application Data

[63] Continuation of Ser. No. 544,521, Jan. 27, 1975, abandoned.

[30] Foreign Application Priority Data

Jan. 25, 1974 United Kingdom ............... 3502/74

[51] Int. Cl.² .......................................... H04L 27/10
[52] U.S. Cl. .................................. 178/66 R; 325/30
[58] Field of Search ............ 325/30, 163; 178/66 R, 178/66 A, 69 R, 69 D; 328/163

[56] References Cited

U.S. PATENT DOCUMENTS

| | | | |
|---|---|---|---|
| 3,102,238 | 8/1963 | Bosen | 178/66 |
| 3,473,131 | 10/1969 | Perkins, Jr. | 328/163 |
| 3,566,033 | 2/1971 | Young | 178/66 |
| 3,668,562 | 6/1972 | Fritkin | 178/66 |

Primary Examiner—Benedict V. Safourek
Attorney, Agent, or Firm—Sughrue, Rothwell, Mion, Zinn and Macpeak

[57] ABSTRACT

It is important that a data transmission system should be fast, utilize a minimum of band width and be accurate in the presence of high noise levels. The invention provides a frequency shift keying data transmission system for transmission of binary coded information in which the mark of the coded pulse waveform is represented by a half cycle of one keying frequency and the space is represented by a half cycle of another keying frequency. An improvement in speed, band width utilization and accuracy at high noise levels is obtained by providing that the transmission signal is an approximately sinusoidal waveform of which the phase is continuous at the transitions, the time lengths of the mark and space symbols thereof are matched to the half time periods of the respective keying frequencies and the slope is constant at the cross-over points.

6 Claims, 17 Drawing Figures

(a) THE CONTRIBUTION PER STAGE TO THE OUTPUT
(b) THE OUTPUT WAVEFORM IN FIG. 8
(c) THE CLOCK TO SR 21
(d) THE CLOCK TO SR 22 (4 X FREQUENCY OF (C) FOR ILLUSTRATION)
(e) THE QUANTIZED OUTPUT
(f) A 1011 OUTPUT (ON A DIFFERENT SCALE)

DATA TRANSMITTING SYSTEMS

This is a Continuation, of application No. 544,521, filed Jan. 27, 1975 now abandoned.

This invention relates to data transmission systems.

British Pat. Specification No. 1,223,553 describes a digital data transmission system of the frequency shift keying (FSK) type, in which a mark of binary coded data is represented by one half of a cycle of one frequency and a space by one half of a cycle of another frequency, and two frequencies being provided by a frequency shift oscillator and the transition from one frequency to the other taking place smoothly at substantially the zero cross-over points.

Although the transitions between adjacent half cycles is smooth there is a change in slope at cross-over points as the frequency of the oscillator producing the half cycle changes from one keying frequency to the other. Such changes in slope are slight where the frequency difference between the keying frequencies is small compared with their absolute value but in low frequency systems, such as may be used over public telephone lines giving a band width of about 300 Hz to 3500 Hz, the frequency difference may be such as to give significant slope changes. These changes in slope may lead to errors in detection in the receiver particularly in the presence of high noise levels.

An object of the present invention is to provide an improved data transmission system capable of an improved error rate of detection in high noise conditions.

According to the invention, there is provided a frequency shift keying data transmission system for transmission of binary coded information in which the mark of the coded pulse waveform is represented by a half cycle of one keying frequency and the space is represented by a half cycle of another keying frequency, wherein the transmission signal is an approximately sinusoidal waveform of which the phase is continuous at the transitions, the time lengths of the mark and space symbols thereof are matched to the half time periods of the respective keying frequencies and the slope is constant at the cross-over points.

Conveniently, there are provided means for storing the data waveform, means for converting the data waveform into a waveform in which the time lengths of the mark and space symbols thereof are matched to the half time periods of the respective keying frequencies and filter means, which from the matched waveform produces said approximately sinusoidal waveform.

Detection of the received signal is a time domain process in which the time duration between cross-over points is measured and compared with a reference to determine whether the interval is that of the shorter half time period of the higher frequency or that of the longer half time period of the lower frequency.

Preferably the matched waveform is a rectangular waveform.

The filter means may be a low-pass filter of the Butterworth type through which the matched rectangular waveform is forced to produce the approximately sinusoidal waveform.

Conveniently, the filter means is a so-called "digital" filter which generates an analogue waveform from the halfcycle per bit rectangular waveform. The digital filter comprises a shift resister, the outputs of which are connected to a summing arrangement so that each stage of the register contributes a preset amount of gain. To obtain a constant slope (a linear staircase) the majority of stages contribute an equal amount of gain.

Where the output signal is to be transmitted over lines including transformers it is preferable to equalise the areas of the mark and space half cycles by reducing the amplitude of the lower frequency half cycles. This may be achieved by passing the signal before and/or after the filter through a gating attenuator controlled by the matched rectangular waveform signal. The attenuator may be a potentiometer arrangement in which an element is switched in or out by a transistor gated according to the data being transmitted. An alternative arrangement is to use a C-MOS logic inverter from which the logic amplitude is proportional to the supply voltage and to gate the supply voltage to a lower value for transmission of the longer duration half cycles. Additionally D.C. restoration and/or clamping may be performed at the receiver and/or transmitter.

Embodiments of the invention will now be described with reference, by way of example, to the accompanying drawings, in which.

The data waveform of the half cycle FSK in accordance with the invention has the following characteristics:

i. Data symbols represented by half cycles of the keying frequencies.
 ii. Continuous phase at the transitions of the waveform.
 iii. Constant slope at the cross-overs of the waveform.

Figure 1:
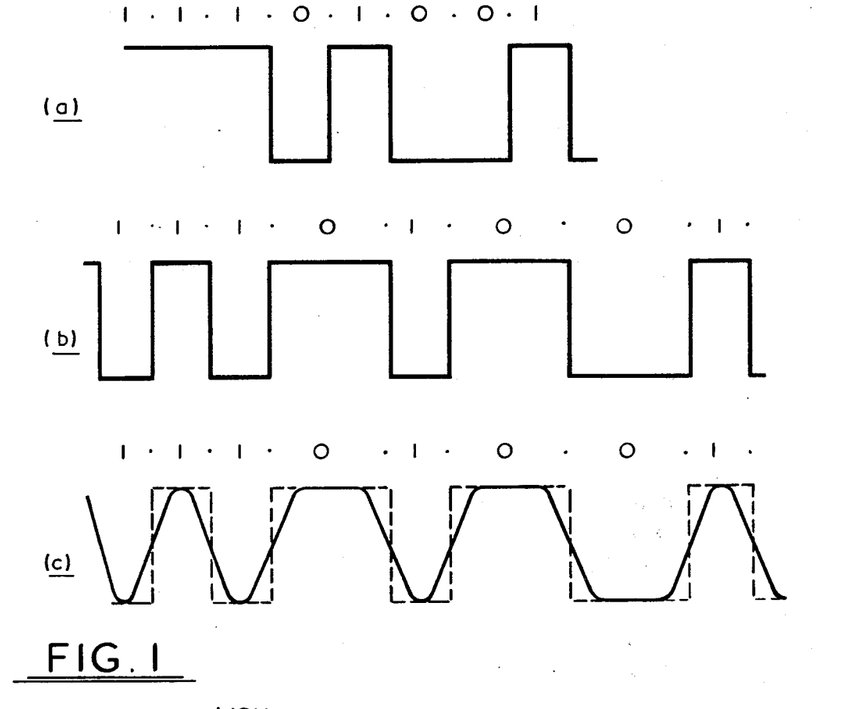
FIG. 1 is a waveform diagram.

Information from a data source usually has equal time intervals for both mark and space symbols such as shown in FIG. 1a. In a half cycle FSK waveform the time lengths of the mark and space symbols correspond to the half cycle durations of the two different frequencies and are thus unequal as shown in FIG. 1b. To enable this time conversion to be carried out the data waveform is stored temporarily. The system thus first of all generates a rectangular waveform in which the length of the symbol time period is equal to the half time period of the corresponding FSK, frequency. The rectangular data waveform is then passed through a low-pass filter giving a continuous sinewave of the required characteristic as shown in FIG. 1c. The phase is continuous at the transitions, due to direct derivation from the input rectangular wave. The slope at the cross-overs is always constant, as it is proportional to the band width of the low pass filter. It is to be noted that in the prior art where the frequency of a single sinusoidal oscillator is varied a constant slope is not obtained.

The constant slope property of the output data wave is important, since the detection process employed relies on a constant slope at the cross-over points for minimum error in high noise conditions.

Figure 2:
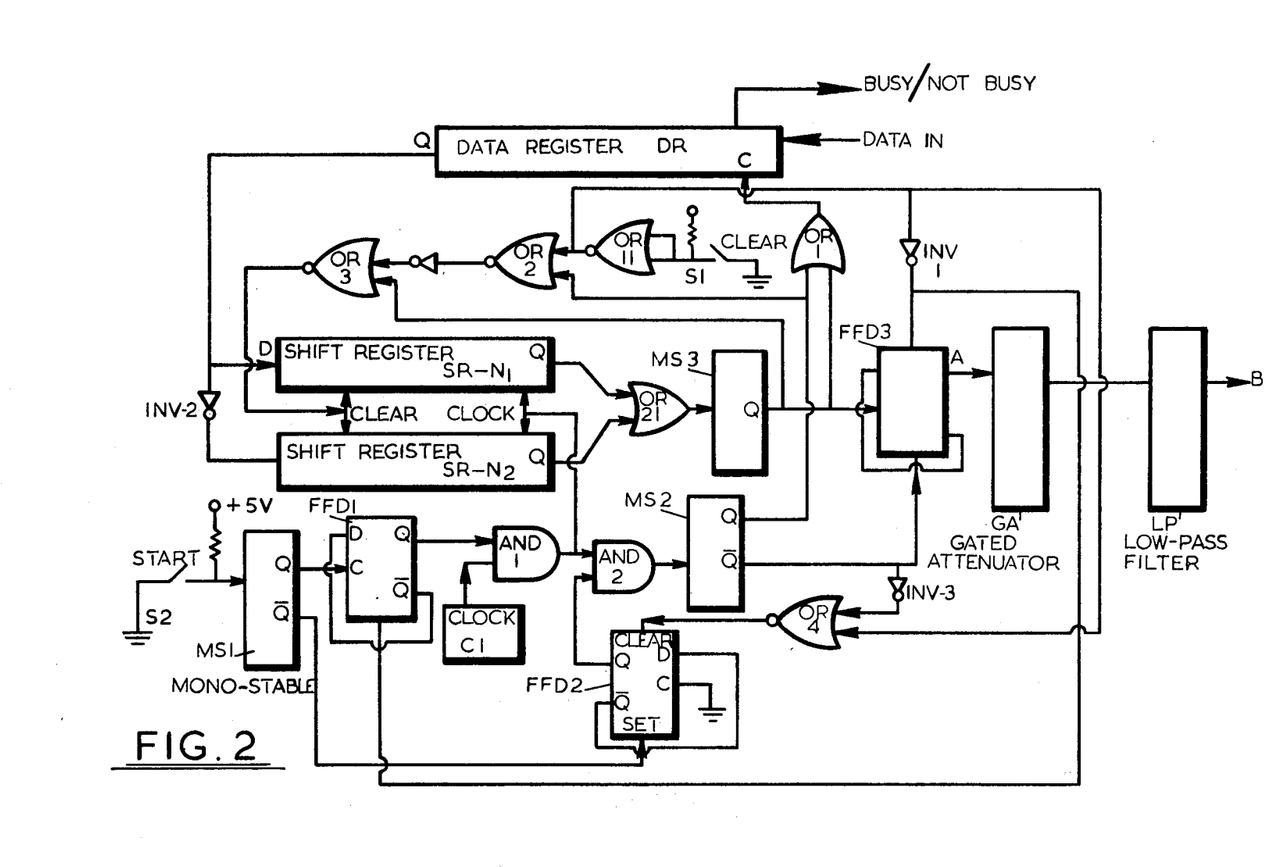
FIG. 2 is a schematic block diagram of a transmitter in accordance with the invention.

FIG. 2 shows a transmitter in block diagram form. The following definitions apply for the description of the system diagram.

| | |
|---|---|
| $MS_n$ = Mono-stable number-n | n = 1,2,3,... |
| FFDn = Flip-flop D-type number-n | |
| DR = Data register | |
| SR-Nn = Shift register number-n of N-number of stages | N = 1,2,3 ... |
| AND-n = AND gate number-n | |
| OR-n = OR gate number-n | |
| INV-n = Inverter number-n | |

Before describing the operation of the half-cycle per bit FSK system, the functions of the different blocks are described.

i. FFD1 and FFD3, the D-type flip-flops, complement their output levels at the instant of every clock pulse applied.

ii. FFD2, the clock input terminal of this flip-flop is earthed. Therefore information at its D-input is not transferred to the output terminals. Its Q-output is made high or low, that is, it is SET or CLEARED, by applying low-pulses to the respective input terminals.

iii. DR: The data register, transfers in sequence the data information stored in it to the inputs of N1- and N2- shift registers by the application of clock pulses. The clock to DR is high whenever either outputs respectively of the monostables MS2 and MS3 becomes high. A busy/not busy output prevents it receiving new data until the existing data has been transferred.

iv. SR-Nn: The shift registers N1- and N2- transfer information from inputs D to output Q after the application of $N_1$ and $N_2$ clock pulses respectively. These shift registers consist of RS master-slave flip-flops. Therefore information to be transferred must be present at their inputs prior to the rising edge of the clock input voltage waveform.

v. Due to the inverter INV-2, the input to SR-N1 is high and that to SR-N2 is low, when the data symbol to be transferred is a 1 or mark and vice-versa when the symbol is 0 or space.

vi. Low-pass filter: The low-pass filter converts a rectangular wave, from the Q-output of FFD3, into a continuous sinewave. The characteristic of the filter is such that a constant slope is maintained at the cross-over points, that is, at points where the wave passes from one half to the next half of the cycle.

vii. Clock: A highly stable oscillator. The frequency of the clock depends upon the two keying frequencies in the required FSK wave and the number of stages in the N1- and N2 shift registers. For example, if the two keying frequencies are 1 kHz and 2kHz, then the ratio in the stages of the two shift registers must be 2:1. These keying frequencies can be obtained with different clock frequencies, so long as the ratio in the stages of the two shift registers is kept at 2:1. With SR-N1 consisting of 10-stages and SR-N2 of 5-stages a clock at 20 kHz is required to produce 1 kHz and 2kHz keying frequencies; whilst with SR-N1 20-stages and SR-N2 10-stages a clock frequency of 40 kHz is needed to generate the same keying frequencies.

In describing the operation of the circuit to produce a half-cycle per bit FSK continuous sinusoidal wave, it is assumed as an example that the data to be transmitted is 1010011 and that this data is stored in the data register DR.

First a clear pulse is applied to the various units by momentarily closing switch S1 which sets all the Q-outputs in the system to a low-level and all $\overline{Q}$-outputs to a high-level. Pulses from the clock source C1 are prevented from being applied to the circuit by a low Q output of flip-flops FFD1 inhibiting gate AND-1. Therefore the system remains in the clear state.

On application of a start pulse, represented by momentarily closing switch S2, mono-stable MS1 produces a positive pulse at Q and a negative pulse at $\overline{Q}$. The positive pulse from Q sets flip-flop FFD1, which in turn enables AND-1. Clock pulses are applied to the shift registers SR N1 and SR-N2 and to a gate AND-2.

A negative pulse from $\overline{Q}$ of mono-stable MS2 sets flip-flops FFD2, which in turn enables AND-2 from its Q output. The first clock pulse that passes through gate AND-1 triggers mono-stable MS2 after passing through the enabled gate AND-2, producing a positive pulse at Q and a negative pulse at $\overline{Q}$, which latter sets flip-flops FFD3 so that its output Q at the point A goes high. The $\overline{Q}$ output of MS2 also clears FFD2 which in turn inhibits AND-2. Thus only the first clock pulse is allowed to pass through AND-2, and subsequent clock pulses are prevented from effecting any change in the output at point A.

By this arrangement the rising edge of the first clock pulse to shift registers, and the rising edge of the first half cycle in the rectangular output data wave at point A are brought in phase.

A positive pulse form Q of MS2 clears the shift registers and also shifts the first information bit from the data register DR to the inputs of shift registers SR-N1 and SR-N2. Taking the data 1010011, the first data bit stored in data register is a 1 and thus, before the arrival of the second clock pulse, the input at SR-N1 becomes high and that at SR-N2 becomes low.

The subsequent clock pulses ripple through the information from the inputs of the shift registers towards their outputs. The shift register SR-N1 has three-stages and SR-N2 has four stages. When the 4th clock pulse (which in fact is the 3rd clock pulse after the transfer of the information from the data register to the inputs of the shift registers) clocks, inter alia, SR-N1 its Q output goes high, the rising edge of its level triggering a mono-stable MS3 after passing through a gate OR-21.

A positive pulse from the Q output of MS3 clocks FFD3 and complements the state of its output level Q, that is, the level falls to the low logic value. The time elapsed between the instants when the first clock pulse makes Q (points A) high, and the start of the 4th clock pulse when Q goes low is equal to 3 clock pulse periods.

The same positive pulse from MS3 also clears the shift registers through a gate OR-3, and clocks the data register DR through gate OR-1 to bring forward the next data bit to the inputs of the shift register.

The 2nd data bit is 0. This makes the input level at SR-N1 low and that of SR-N2 high. The 5th and 6th clock pulses ripple through the information in the shift registers.

When the 8th clock pulse (which is in fact the 4th clock pulse after the last transfer of data information from data register to the inputs of the shift registers) clocks, inter alia, SR-N2 output Q goes high, the rising edge of its level triggering a mono-stable MS3 after passing through gate OR-21. The positive pulse from Q of MS 3 carries out again the following functions:
 i. complements the output of FFD3
 ii. clears the shift registers
 iii. transfers the next information bit from the data register DR to the inputs of shift registers.

The time elapsed between the instant when the output at the point A goes low, at the arrival of 4th clock pulse, and it goes high, at the arrival of 8th clock pulse, is 4 clock pulse periods.

In this way a rectangular wave is obtained at the point A. Each half cycle of this wave is $N_1$ or $N_2$ clock pulses long, corresponding to 1 or 0 in the data information transferred to the inputs of the shift registers. To equalise the areas of the half cycles of the different frequencies the waveform is then passed through a gated attenuator GA to reduce the amplitude of the lower frequency half cycles. This rectangular wave is passed through a low pass filter LP and the required half cycle per bit FSK continuous sinewave, with constant slope at the cross-overs is obtained at its output point B.

Figure 3:
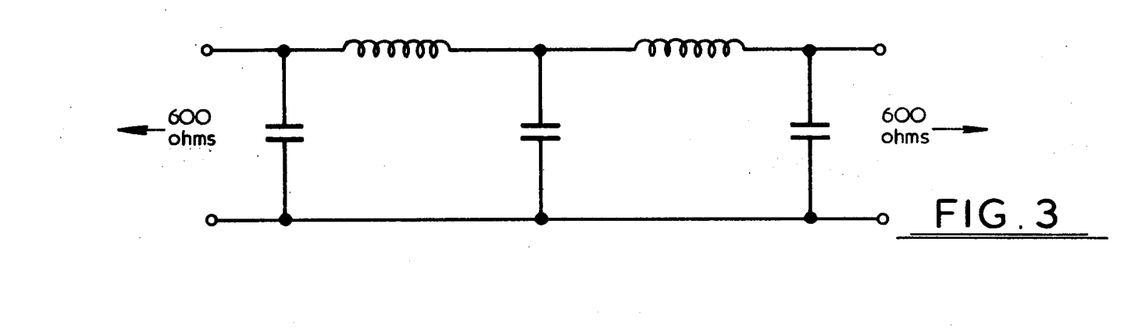
FIG. 3 is a schematic diagram of a filter used in the transmitter of FIG. 2.

The low-pass filter LP is conveniently a Butterworth filter of the form shown in FIG. 3. In the arrangement shown the cut-off frequency was 3000 Hz and the termination impedances 600 ohms to suit the impedance of normal telephone lines. The design of Butterworth filters is given in "Filter Design and Evaluation" by Grant E. Hansell, Van Nostrand Reinhold Company, 1969.

When a waveform edge is forced through such a filter an output waveform of the form shown in FIG. 1c is obtained in which the corresponding rise or fall has a substantially constant slope particularly in the region of the cross-over point.

The circuit arrangement is such that each half cycle in the rectangular wave contains an exact number of clock pulses. That is, the leading edge of the rectangular half cycle coincides with the rising edge of the first clock pulse, and the rear edge with the rising edge of the last plus one clock pulse. However, there is a possibility of error up to half period of the clock pulse in the very first data symbol half cycle. This could happen if the clock is already high at the input of gate AND-1 before the Q output of FFD1 goes high on the application of the start pulse. The probability for this is ½, but once the system is started, there is no such possibility and subsequent half cycles contain an exact number of clock pulses.

Figure 4:
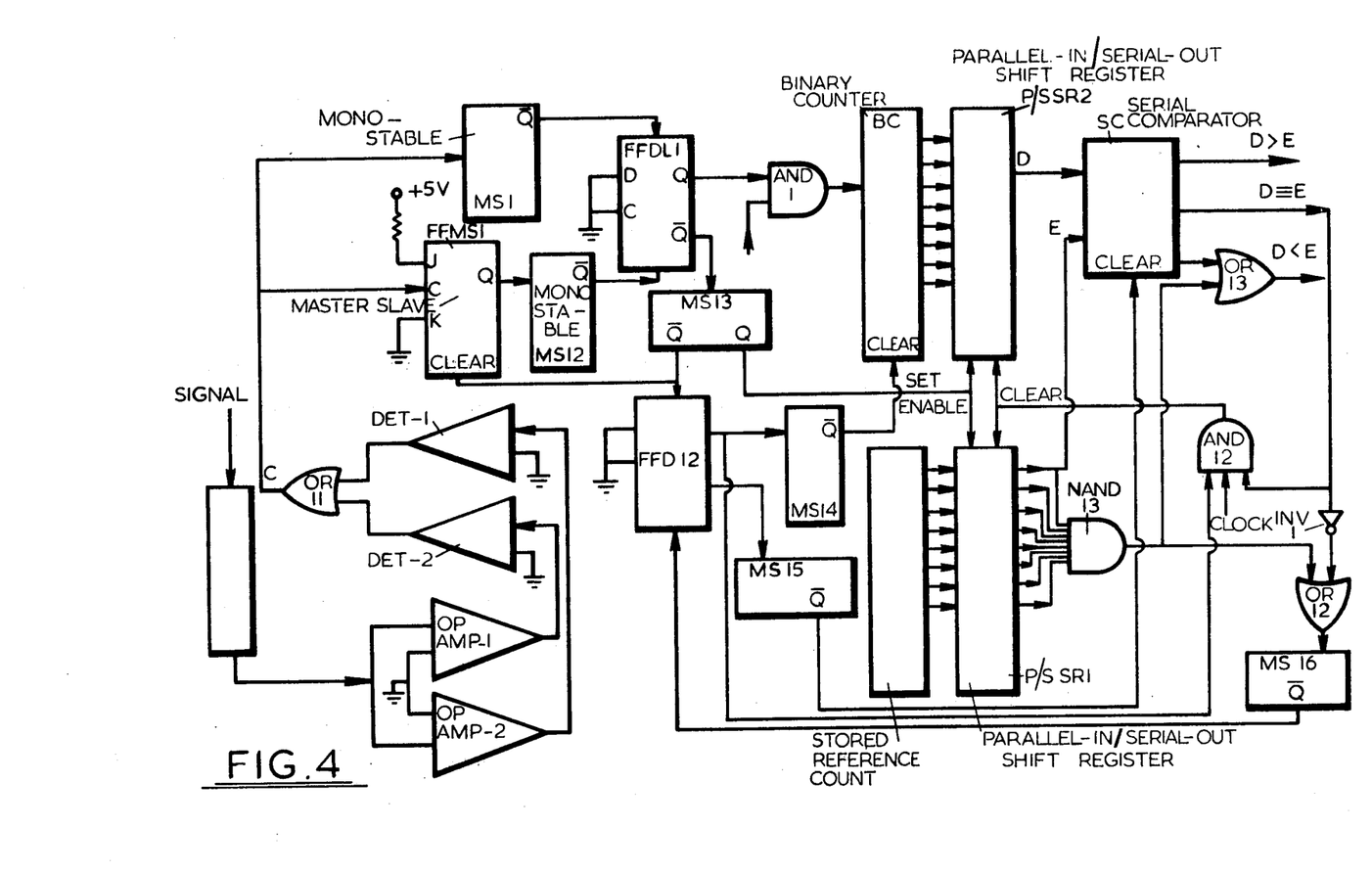
FIG. 4 is a schematic block diagram of a receiver in accordance with the invention.

FIG. 4 is a block diagram of a receiver operating in the time domain. The time duration of each half cycle of the received data wave is measured by counting clock pulses of a known frequency, the count corresponding to each received half cycle being compared with a threshold count stored in the receiver. If the received count is less than the threshold count, the received data symbol corresponds to the higher keying frequency. If it is greater than the threshold count the data symbol corresponds to the lower keying frequency.

The following additional nomenclature has been used in the description of the system.

P/S SR-n = Parallel-in/Serial-out shift register number-n

The functions of sub-units in the system are given below.
 i. Bandpass Filter BP: This determines the noise bandwidth and reduces the effects of line distortion and interference from outside the channel.
 ii. Operational amplifiers OP.AMP 1 and OP.AMP 2 act as a transformer to generate a push pull wave from the received data wave.
 iii. Zero-crossing detectors DET-1 and DET-2 produce a positive logic level output so long as the input lies above zero.

The received data wave after passing through the bandpass filter BP is applied to the two operational amplifiers OP.AMP1 and OP.AMP2 which have unity gain, one being arranged to invert and the other not. The output waveforms from these amplifiers are thus similar to the receives data wave with one inverted with respect to the other.

The operational amplifier outputs are applied to the inputs of separate zero-crossing detectors DET-1 and DET-2 outputs of which are positive rectangular pulses of width equal to the positive half cycles of the waveforms. The detector outputs are passed through gate (OR-11) and a train of positive rectangular pulses is obtained, the width of the pulses being equal to the duration of the corresponding half cycle in the received data wave.

It is assumed that the receiver has been cleared before data is received. In this case all the Q-outputs are low and $\overline{Q}$-outputs high.

Each data pulse at point C (the summed output point of the two zero-crossing detectors) sets flip-flop FFD11 through MS11 at the instant of the leading edge, and clears it through the action of a master-slave flip-flop FFMS1 and mono-stable MS12 at the trailing edge. On the arrival of a data pulse, when FFD11 is set by the rising of the pulse, the Q output of FFD11 goes high and enables the AND-11 gate and the binary counter starts counting the clock pulses from AND-12. At the instant of the falling edge of the data pulse, FFD11 is cleared, that is its $\overline{Q}$ output goes low and its Q output goes high, the low Q output disabling AND-11 so that no more clock pulses pass through it to a binary counter BC. The count of the clock pulses received by the counter now corresponds to the width of the received data pulse at point C. The high $\overline{Q}$ output of FFD11 triggers a mono-stable MS13, and a positive pulse is produced at its Q output and a negative pulse at its $\overline{Q}$ output. A positive pulse from its Q output enables the loading of the parallelin/serial-out shift registers P/S SR1 and 2. P/S SR-1 is loaded with the stored threshold reference count and P/S SR-2 with the count held in the counter BC. A negative pulse from the $\overline{Q}$ output of MS 13 clears the master-slave flip-flop FFMS 1 and sets a flip-flop FFD12 whose Q output then goes high and $\overline{Q}$ output goes low, and high Q output through a mono-stable MS 14 clearing the binary counter BC.

The off-set voltage of the zero-crossing detectors DET 1 and DET2 provide enough separation between the successive pulses at the point C, such that both the master-slave flip-flop FFMS1 and the binary counter BC are cleared before arrival of the leading edge of the next data pulse. A high Q also enables output FFD12 a gate AND-2, and clock pulses through AND-2 start clocking shift registers P/S SR1 and 2. The most significant bits from the two counts appear first, and the reference count and the received count are compared bit by bit in the serial comparator SC. So long as the bits in the two counts are equal the point D≡E remains high and the clock pulses through AND-12 continue to transfer bits from the two counts for comparison. As soon as inequality in the counts is detected, either D>E or D<E goes high and D≡E goes low, a high D>E or a high D<E indicating detection of a particular symbol in the received data wave. A low D≡E disables gate AND-12, and no more clock pulses pass through it. A low D≡E also clears FFD12, so that its Q output goes low and its Q̄ output goes high, the latter through a mono-stable MS15 clears serial comparator SC, and D≡E goes high. At the same time the low output keeps AND-12 disabled.

In the system the counter SC is 8-stages long, therefore, at least eight clock pulses through AND-12 are required to make decisions about the received data pulse. The time interval for 8 clock pulses may be smaller than the separation between successive received pulses at the point C. If the time interval for 8 clock pulses is longer than the separation between the successive received pulses at point C, the system still operates satisfactorily because the count of a received pulse is transferred to the P/S SR-2 and the counter is cleared soon after the end of the pulse, and the counter becomes available for the next received pulse. The counter is cleared before clock pulses through gate AND-2 are allowed to start the comparison process. The binary counter can receive pulses during the time of the comparison process without effecting the decision of the comparator.

A situation may arise when the count of the received half cycle width is equal to the stored threshold count. In such a case when all the bits have been compared a pulse is generated at the end of the process. This pulse may be OR-gated with either D>E or with the D<E output, and one of the two data symbols is recorded.

The Q-outputs of P/S SR-1 are connected to the inputs of an 8-input NAND gate NAND 13. The input terminals of the shift-registers have been earthed and after the registers are loaded, the clock pulses start loading the count bits into the serial comparator. At each clock pulse as the count moves forward, the previous stage is filled with a 0, since the input terminals are earthed. When the full count is compared, all the 8 Q-outputs of S/P SP-1 become 0 and the output of NAND-13 becomes high. If this output is gated in gate OR-13 with D<E it will record the symbol assigned to the D<E decision. The high output from NAND-13 also clears FFD12 which in turn disables AND-12, preventing further clock pulses from clocking the shift registers. With FFD12 cleared, its Q̄ output becomes high which, via MS15, clears the comparator SC. This process requires only 8 clock pulses and the comparator becomes available well before the next count arrives.

Figure 5:
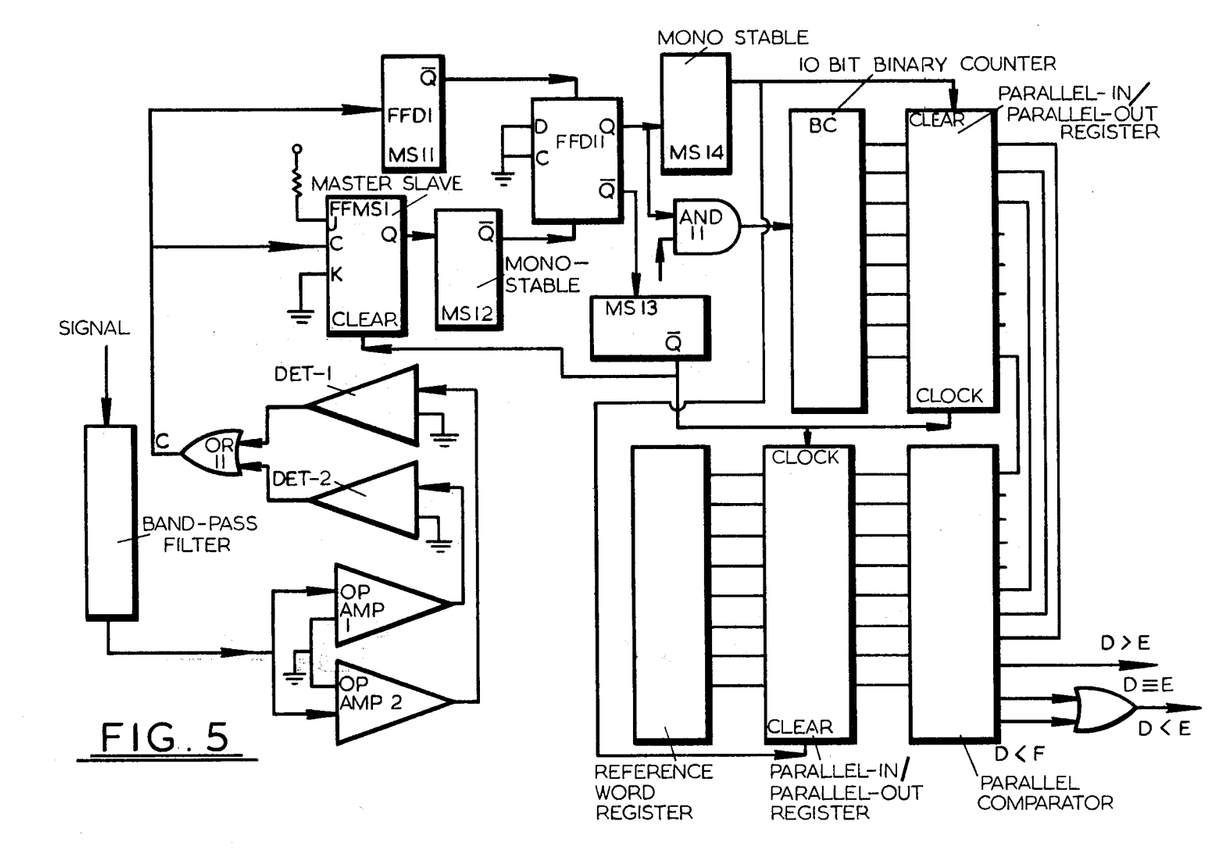
FIG. 5 is a similar diagram of an alternative arrangement to FIG. 4.

An alternative detection system with a parallel comparator is shown in FIG. 5, in which the received count is compared instantaneously at the instant of the falling edge of the received half cycle. This arrangement requires fewer components than the serial method. Using one binary counter in the system, some separation between the successive pulses at point C is essential. Even when using a parallel comparator this separation must be more than the response time of a D-type flip-flop (this is in reference to the use of a parallel comparator). If exact zero-crossing detectors are used, then two counters and associated changes in the circuit are required. The separation between the successive received pulses at point C, due to the action of the off-set voltage of the zero-crossing detectors, does not alter the difference between the widths of the half cycles representing the mark and space symbols. This is due to the action of the off-set voltage, in which equal time intervals are subtracted from each received half cycle.

Figure 6:
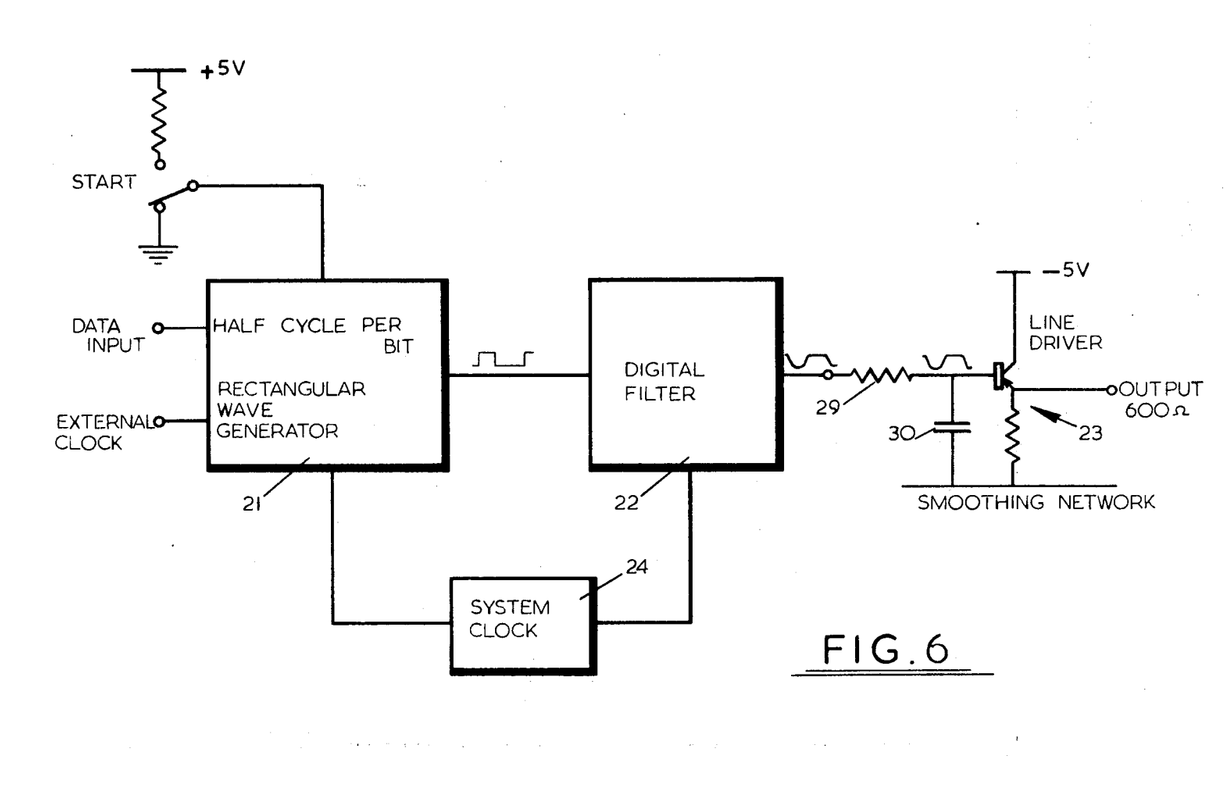
FIG. 6 is a block diagram of another transmitter in accordance with the invention.

A block diagram of another transmitter is shown in FIG. 6. A half-cycle per bit rectangular wave generator 21 generates a rectangular waveform in which the length of the symbol time period is equal to the half-time period of the corresponding frequency. The rectangular data waveform is then passed through a "digital" filter 22 which converts it into the require output waveform, i.e. wave with continuous phase at the transitions, and constant slope at the crossovers. A line driver 23 supplies the output power, and a system clock 24 provides the timing waveforms for the rectangular wave generator 21 and the digital filter 22. The operation of the latter two components will now be explained.

Figure 7:
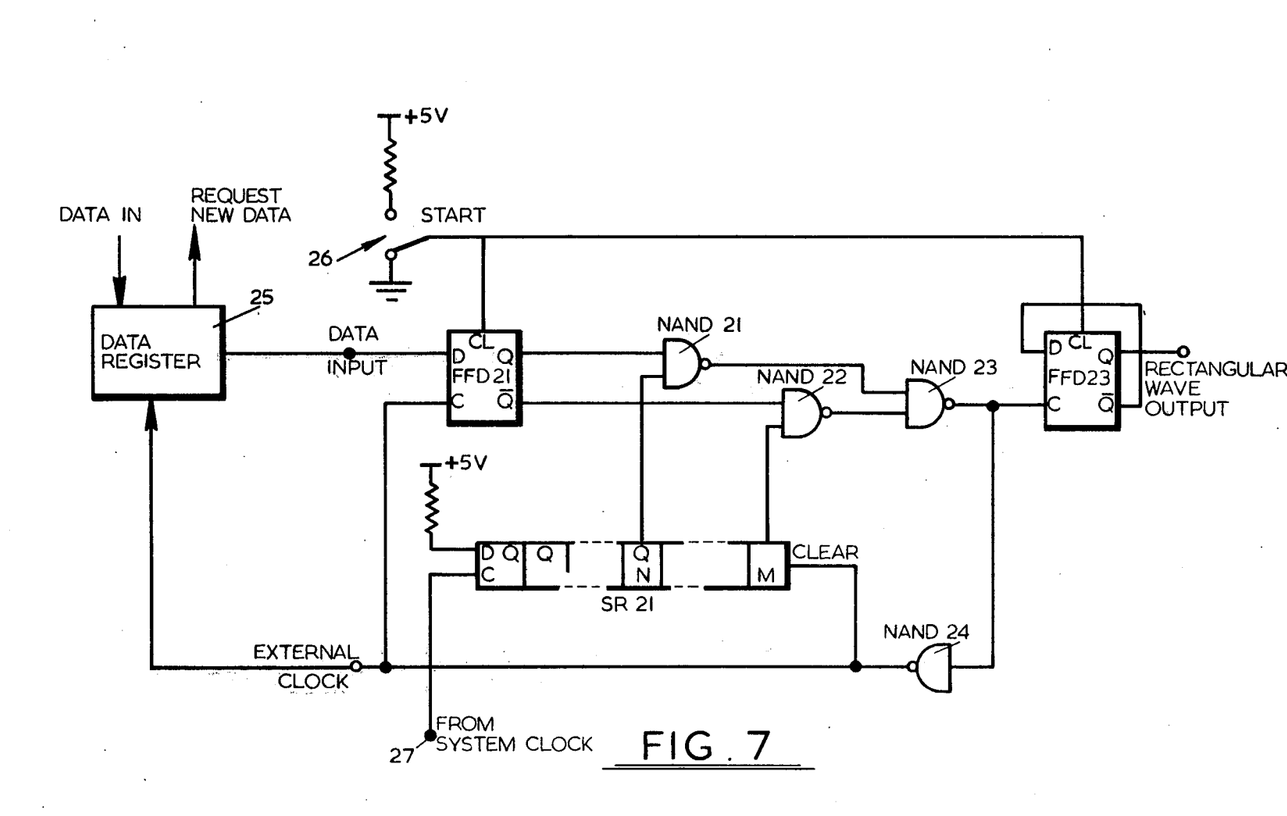
FIG. 7 is a logic diagram of the rectangular wave generator of FIG. 6.

The logic diagram of the rectangular wave generator 21 is shown in FIG. 7. The logic components are briefly explained below.

FFD21 - A D-type flip-flop, which transfers information from its D input to its Q-output on the rising edge of a clock pulse. Its Q output is made low, i.e. cleared, by applying a low level to the clear input CL.

FFD22 - Identical to FFD21, except that in this connection it complements its output on the applicaion of a clock pulse at input C.

SR21 - A shift register consisting of RS masterslave flip-flops. Information to be transferred must be present at its input before the rising edge of the clock waveform. All outputs are taken low, i.e. cleared, by applying a low level to the clear input.

The generator operates in the following sequence.

i. Binary data to be transmitted is transferred and stored in a data register 25, one bit per stage, the output being connected to DATA INPUT, the D-input of FFD1.

ii. In the quiescent condition with START 26 held low, the Q outputs of FFD21 and FFD22 are held low, thus disenabling the input and output logic. However, the shift register SR21 and internal logic of NAND gates constantly operates in a closed loop sequence.

iii. Taking START 26 high enables FFD21 and FFD22, thus the first pulse to appear at the output of NAND 23 after START has been taken high, clocks FFD22 and via NAND 24, clears SR21 and clocks FFD21 which presents the first bit of data at its Q output. How this pulse appears will be evident later. The data thus appears as a high logic level at either Q or Q̄ of FFD21.

iv. With NAND gates, if one input is held high, then a change in the other input will result in a change of output, i.e. by holding one input high, the gate is enabled. Thus, if the data is a '1' then NAND 21 is enabled and if the data is a '0' then NAND 22 is enabled.

v. Either state is held while SR21, with the D input of its first stage held high propagates a high logic level through its stages under the action of the system clock pulses at 27. Thus the Q outputs of the N and M stages will go high after N and M clock cycles respectively.

v. If NAND 21 has been enabled, its output will go low after N clock cycles and if NAND 22 has been enabled its output will go low after M clock cycles.

vii. Either output going low takes the output of NAND 23 high. If the data is a '1' then NAND 23 goes high after N cycles of clock and if the data is a '0' then NAND 23 goes high after M cycles of clock.

viii. The low-to-high transition of NAND 23 clocks FFD22.

ix. The output thus changes state after N cycles of clock if the date is a '1' and after M cycles of clock if the date is a '0'. A half-cycle per bit rectangular waveform is thus obtained.

x. When the output of NAND 23 goes high the output of NAND 24 goes low.

xi. This high-to-low transition clears SR21 thus the outputs of all stages go low.

xii. The output of the enabled gate returned high causing the output of NAND 23 to return low. The output of NAND 24 then returns high.

xiii. This low-to-high transition clocks FFD21 which presents the next bit of data at its outputs. The circuit thus returns to its initial condition with a new bit of data and the same process repeated.

xiv. The high-to-high pulse which appears at the output of NAND 24, provides an EXTERNAL clock pulse to clock the information along the data register.

xv. It can now be seen that with START 26 low, the Q outputs of FFD21 and FFD22 are low, so the shift register SR21 and logic acts as if a '0' were being continually presented to it, i.e. every M clock cycles the output of NAND 23 goes high, clears the register and returns low.

Figure 8:
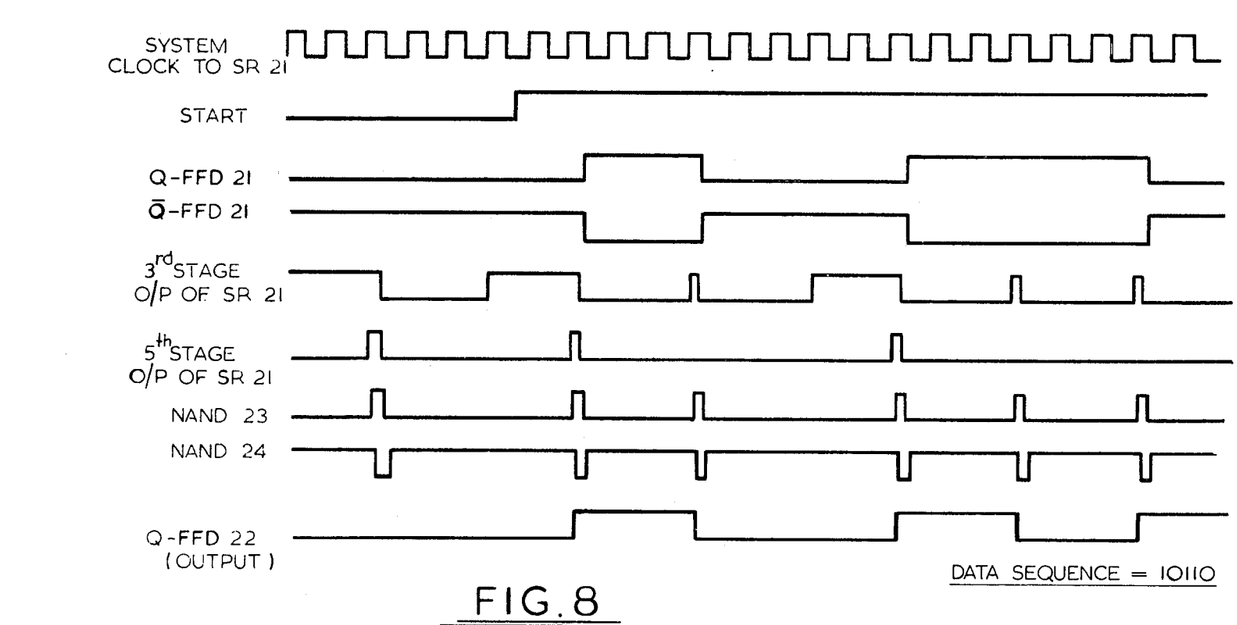
FIG. 8 is a waveform diagram explaining the operation of the generator.

It will now be evident that the durations of the half cycles, i.e. the two frequencies, depend on N M and the clock frequency and the ratio of the frequencies on N and M. Some typical operating waveforms are shown in FIG. 8.

Figure 9:
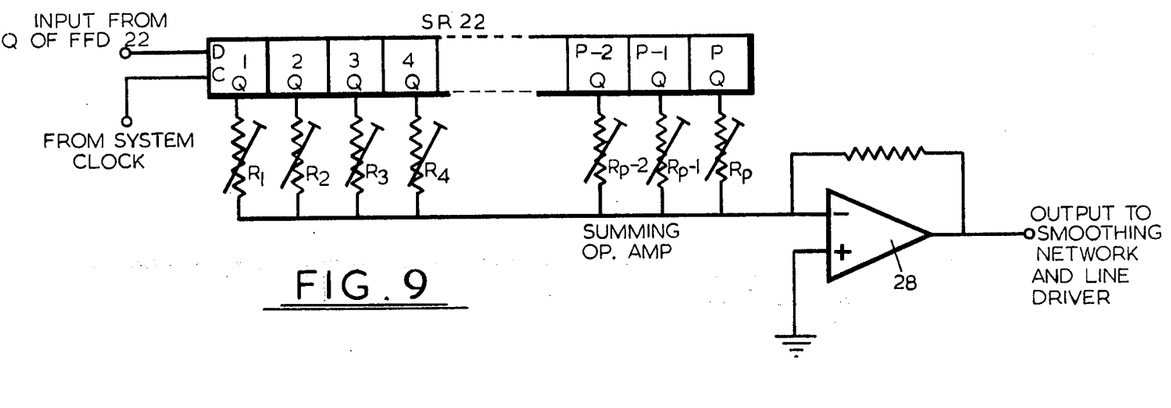
FIG. 9 is a schematic circuit diagram of the "digital" filter of FIG. 6.
Figure 10:
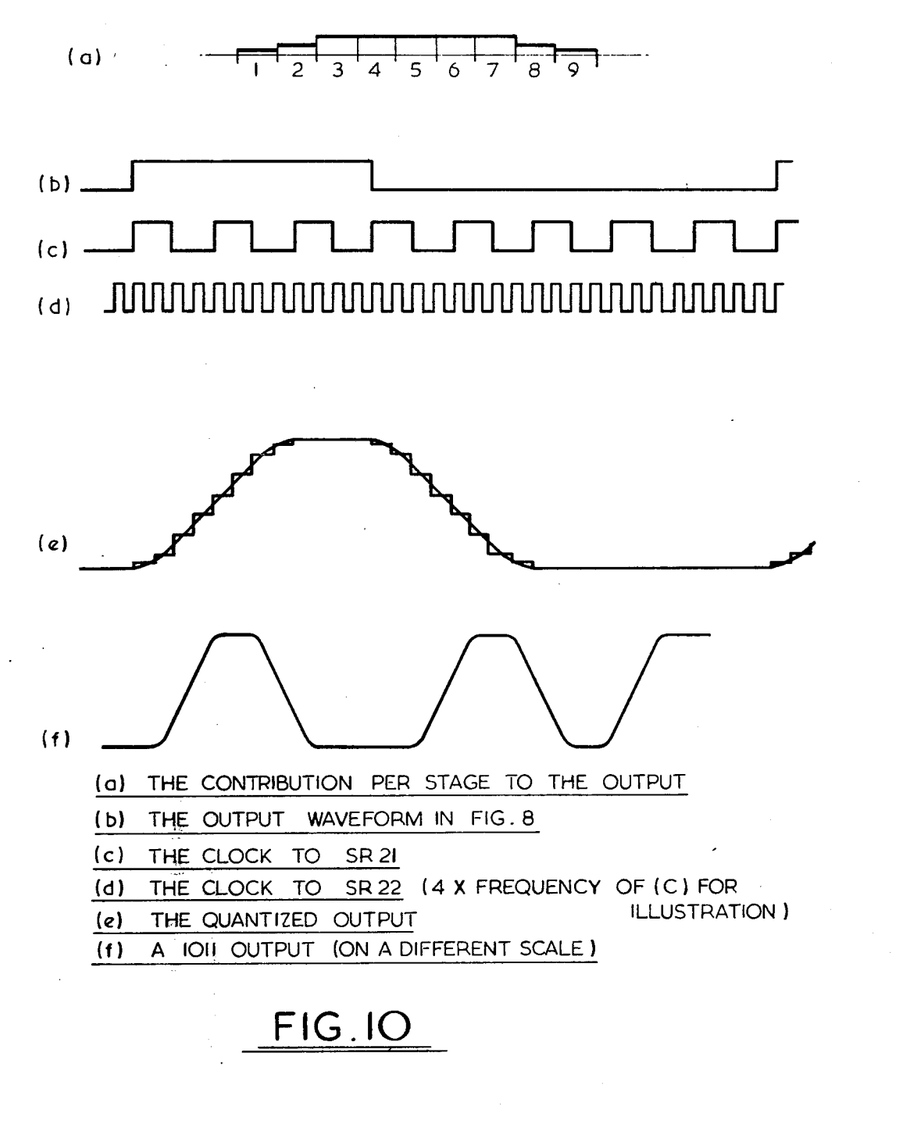
FIG. 10 is a waveform diagram explaining the operation of the filter.

The half cycle per bit rectangular wave output is fed directly to the input of the "digital" filter, the circuit diagram of which is shown in FIG. 9. Essentially, the "digital" filter generates an analogue waveform from the half cycle per bit rectangular wave. Each Q output of a P stage shift-register SR22 is connected via a preset resistor to an operational amplifier 28 connected as a summer. Thus each stage contributes a preset amount of gain. If the outputs are all initially low then as we propogate a high logic level along the register, the analogue waveform builds up stage by stage. For a constant slope (a linear staircase) over the majority of the output change, the majority of the 'inner' stages must have the same gain. The beginning and end stages have a proportionally smaller gain, giving a 'rounded-off' effect in the output waveform at the beginning and end of the transition. With this arrangement, if all the outputs are initially high, then a low logic level passing down the register will produce and output waveform. This waveform is the time reverse of the output waveform produced by a high logic level passing down the register, with all outputs initially low. The conditions of all outputs of SR22 being high or low are obtained from the input itself, by having the time to propogate along the register less than the time of a half cycle of either frequency. This propogation time depends on the length of the register and the clock frequency.

The output shown in FIG. 5 is thus obtained. The slope of the output and hence its bandwidth is determined primarily by the clock frequency and the gain of the centre shift register stages.

Removal of the 'steps' in the output by a simple RC network 29,30 (FIG. 6) produces a reasonably smooth output waveform which is fed to the line driver 23 giving the final output.

Figure 11:
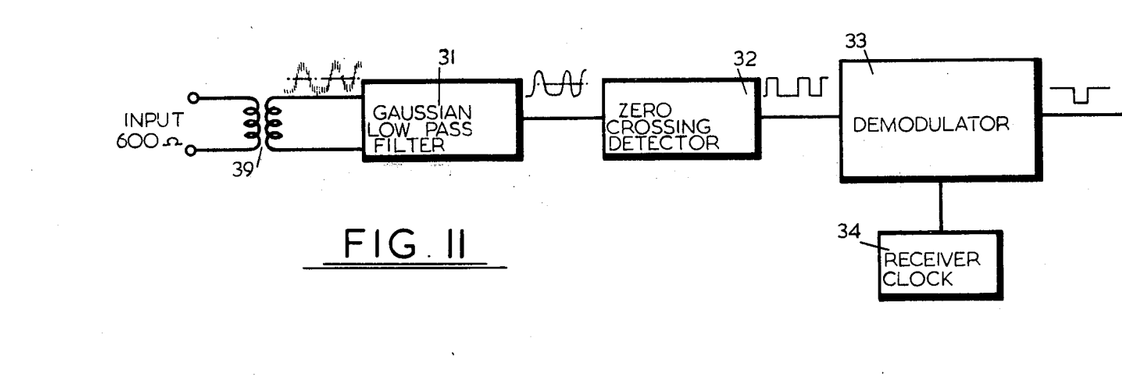
FIG. 11 is a block diagram of another receiver in accordance with the invention.

A block diagram of the another receiver is shown in FIG. 11. A gaussian lowpass filter 31 defines the input signal and noise bandwidth. The filter output is applied to a zero-crossing detector 32 which recovers the half-cycle per bit rectangular waveform. The data is extracted from the waveform by a demodulator 33 under the control of a clock 34. The operation of the zero-crossing detector 32 and the demodulator 33 will now be explained in greater detail.

Figure 12:
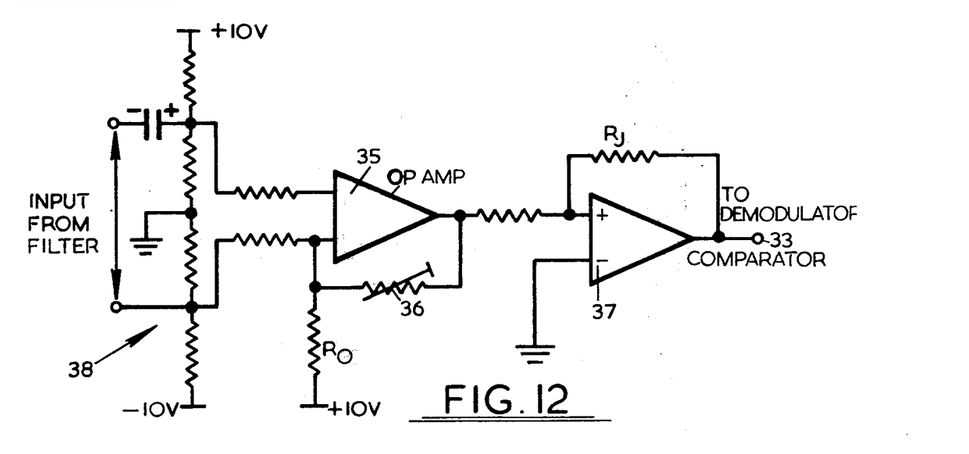
FIG. 12 is a schematic circuit diagram of the zero-crossing detector of FIG. 11.

The circuit diagram of the zero-crossing detector 32 is shown in FIG. 12. An operational amplifier is connected for differential gain and forms a balanced input network. Negative feedback through resistor 36 is applied to limit the gain. Resistor Ro is used to provide offset for the output null position. This offset compensates for the non-zero triggering level of a following comparator 37. The CR (capacitor-resistance) input network 38 forms an effective high-pass filter. The value of C is made such that the cut-off frequency of the 'filter' is less than that of the receiver input transformer 39 (FIG. 11). The output of the gaussian lowpass filter 31 thus appears at the input to the comparator 37 amplified and referenced to earth. Since the reference input of the comparator 37 is tied to earth, the output switches from a high logic level to a low level when the input becomes positive with respect to earth. The comparator 37 thus acts as a zero-crossing detector and produces a half-cycle per bit rectangular waveform from the analogue input. The feedback resistor, Rf, ensures that any slow-rising input causes a sharp transition of the output. The value of Rf, is made large enough to prevent any significant hysterisis effect. With perfect transmission the binary output waveform of the comparator will be identical to the output of the half-cycle per bit rectangular wave generator in the transmitter. The binary output of the comparator 37 is presented to the demodulator 33.

Figure 13:
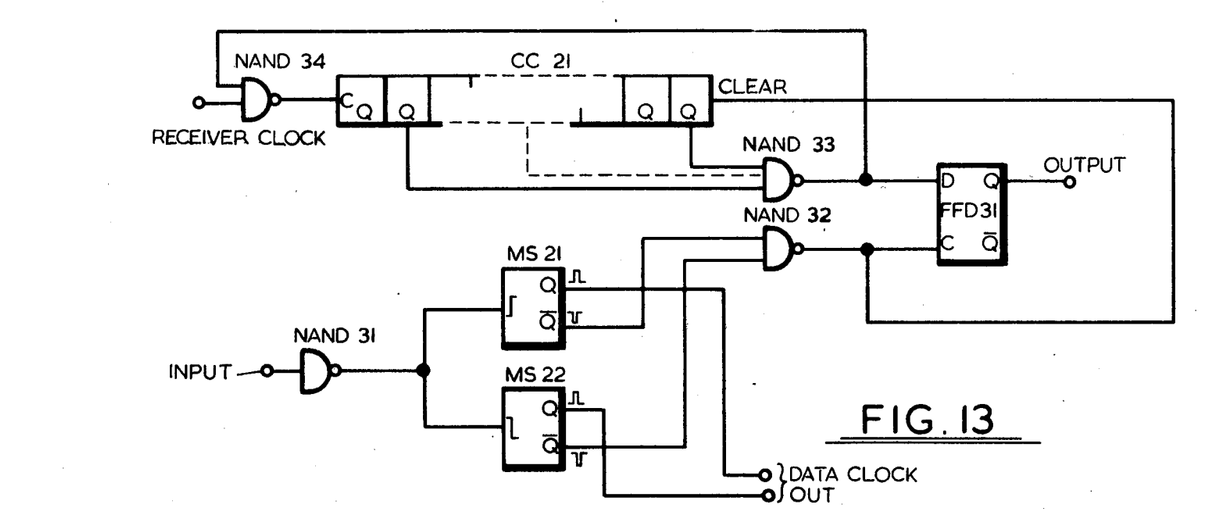
FIG. 13 is a logic diagram of the demodulator of FIG. 11.
Figure 14:
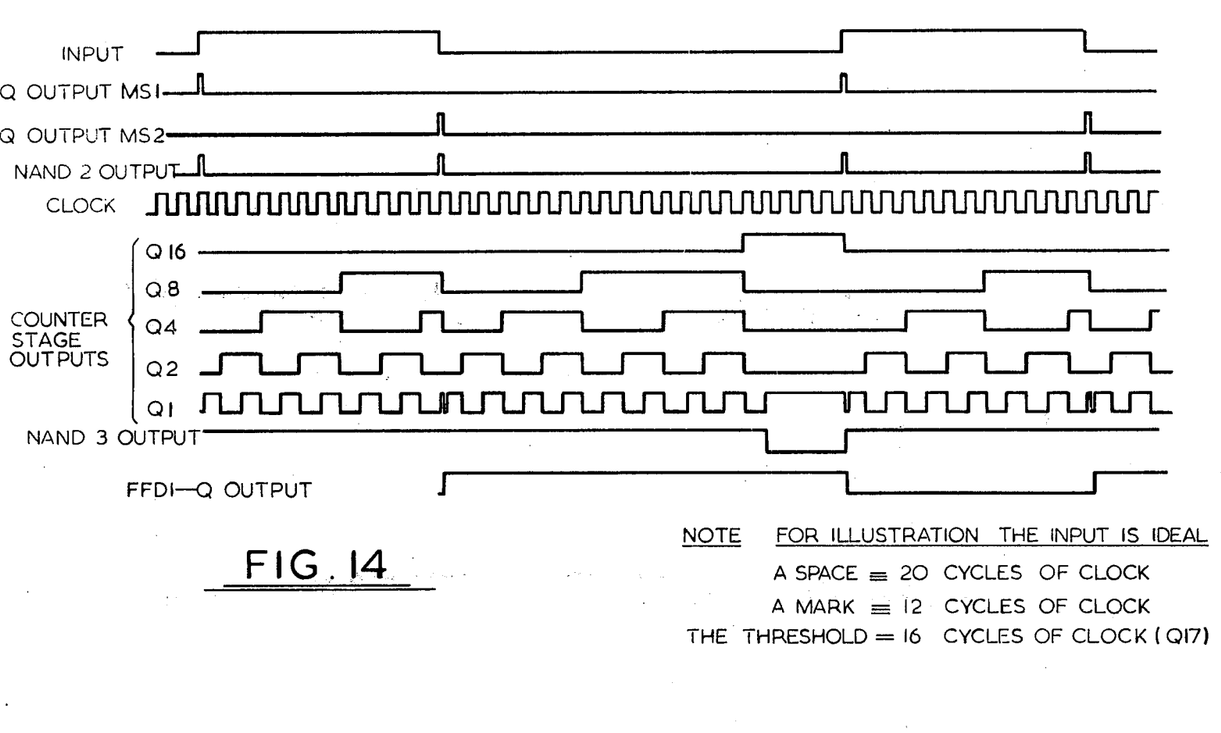
FIG. 14 is a waveform diagram explaining the operation of the demodulator.

The logic diagram of the demodulator 33 is shown in FIG. 13, and some typical operating waveforms in FIG. 14.

The demodulator operates in the following sequence.

1. NAND 31 inverts the input from the zero-crossing detector 32 and drives monostable gates MS21 and MS22. When triggered, a monostable gate will produce a low-high-low pulse at its Q output and a complementary pulse at its $\overline{Q}$ output. The pulse duration depends on external timing components (not shown). Here, the duration must be less than one half of a clock cycle.

2. MS21 is positive-edge triggered that is it produces a pulse on the rising edge of its input waveform. MS22 is negative-edge triggered. Thus each transition of the input (a new bit) produces a pulse at the Q output of either MS21 or MS22. Hence a high-low-high pulse occurs at the $\overline{Q}$ output of MS21 or MS22 when the input changes.

3. A high-low-high pulse on one of the inputs of NAND 32 produces the complement pulse at its output.

4. The leading edge of this pulse clocks FFD31 and clears the counter CC21.

5. Thus at each transition of the input FFD31 is clocked and the counter is cleared.

6. A decision is made on the data content of any half-cycle by measuring its duration. This is achieved by counting the number of cycles of the receiver clock in the duration of the half-cycle input. Since the two signalling frequencies and the clock frequency are known, the number of clock cycles in a mark and a space is also known. The threshold number of clock cycles is exactly midway between the number of clock cycles in a mark and the number of clock cycles in a space. Thus any half-cycle whose 'count' is less than the threshold is declared a mark and any half-cycle whose count exceeds the threshold is declared a space. This is achieved logically as follows:

i. The time between successive clear pulses to the counter is the time of the half-cycle input which generated them. During this time the counter is enabled.

ii. After having been cleared all Q outputs are low, thus the output of NAND 33 is high.

iii. When the output of NAND 33 is high, NAND 34 is enabled and the counter operates under the receiver clock.

iv. When the 'threshold count' is reached all the inputs to NAND 33 will be high.

v. With all inputs high, the output of NAND 33 goes low.

vi. This low logic level disenables NAND 34. This prevents clock pulses reaching the counter and thus the 'threshold count' is held. More particularly, the output of NAND 33 is held low, until the next clear pulse.

Thus if a clear pulse (the end of a half-cycle) occurs before the 'threshold count' is reached, the output of NAND 33 is high and a mark is clocked out through FFD31 by the clear pulse. But if the 'threshold count' has been reached the output of NAND 33 is still low and a space is clocked out.

The Q outputs of MS21 and MS22 are available to transfer the decision on the Q output of FFD31 to an external store.

A point worth mentioning is that if the 'threshold count' is N cycles, the output of NAND 33 is required to change after N complete cycles. That is to say that the inputs to NAND 33 should be from stages with a binary or decimal equivalent of N + 1.

Figures 15, 16, 17:
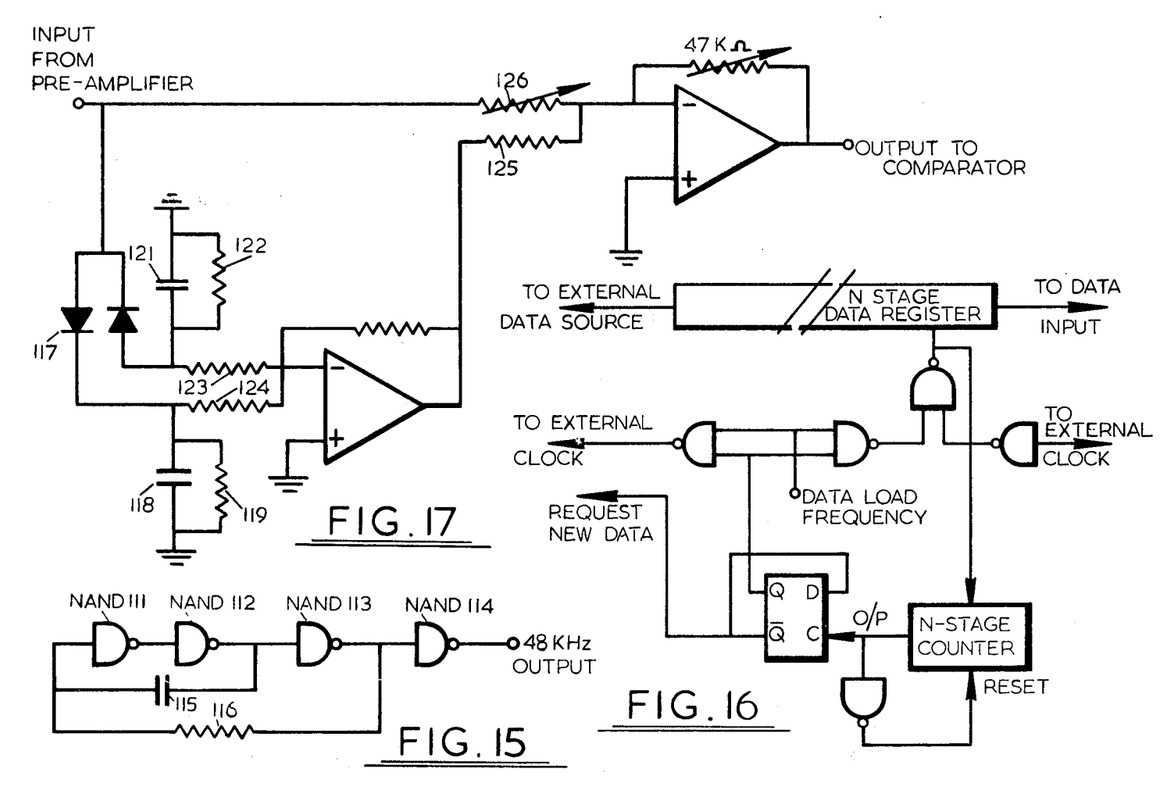
FIG. 15 is a logic diagram of a suitable clock pulse source.
FIG. 16 is a logic diagram of a buffer circuit which may be used as an input or output interface with known data-handling equipment.
FIG. 17 is a circuit diagram for establishing the level of the zero line of the data waveform.

A simple form of source for supplying clock pulses at terminal 27 in FIG. 7 is shown in FIG. 15 and comprises an RC oscillator incorporating NAND 111, NAND 112, NAND 113 and NAND 114. Capacitor 115 and resitor 116 provide the R.C. time constant.

As already mentioned in relation to FIG. 6, the input data, which is of equal time intervals for mark and space symbols, is stored and is withdrawn in time intervals matched to the two different frequencies. In FIG. 7 the time conversion takes place in data register 25. The data is clocked out by the EXTERNAL CLOCK pulse from the output of NAND 24 (waveform NAND 24, FIG. 8). Large data processing systems cannot readily be geared to such a clock waveform and a buffer circuit such as that shown in FIG. 16, may be used. This buffer circuit, which is a temporary store, enables removal of 'packets' of data from the data source at an almost constant rate. Strictly speaking, the output from Request New Data will vary in time with the data. As the length of the register increases, the data will tend to be more random and hence the data will tend to be equal, which will produce request pulses at a constant rate. A similar circuit may be used at the output interface. Such an arrangement makes the system compatible with typical data-handling equipment.

In the presence of a high noise level it is particularly important to establish as accurately as possible the level of the zero line, i.e. the D.C. level of the data waveform. Different duration symbols with constant amplitudes result in the energies used to represent each of the data symbols being different and some form of D.C. restoration is desirable. A good approximation can be obtained by taking the zero line to lie midway between the peaks of the received waveform. FIG. 17 shows a circuit arrangement which includes two peak rectifiers, one (117, 118 and 119) following the positive peaks and the other (120, 121 and 122) following the negative peaks. The two peak values are added algebraically in resistor network 123 and 124. The resultant D.C. level is then added back into the input in network 125 and 126.

The transmitters and receivers described are asynchronous in that the clocks in both the transmitters and receivers are independent and can operate at different frequencies.

The transmitters described are in the main digital systems and each half cycle of the output is always equal to a half period of the keying frequency assigned to the data symbol it represents.

In the receivers the detection of zero crossings of the received half cycle is an analogue process, the remainder of the circuits being digital.

What is claimed is:

1. In a frequency shift keying data transmission system for transmission of information in a binary coded pulse waveform in which the mark of the binary coded pulse waveform is represented by a half cycle of a first keying frequency and the space is represented by a half cycle of a second keying frequency, the improvement comprising: means for the generation of a signal of an approximately sinusoidal waveform having a phase continuous at the transitions of said sinusoidal waveform and wherein the time lengths of the mark and space symbols thereof are matched to the half time periods of the respective keying frequencies and the slope of said approximately sinusoidal waveform is constant at the cross-over points, and means for measuring the time duration between the crossover points of the binary coded pulse waveform signal and comparing the time duration with a reference to determine whether the duration corresponds with that of the shorter half time of the higher keying frequency or that of the longer half time period of the lower keying frequency, wherein said means for measuring and comparing includes a source of clock pulses, a counter connected to said source of clock pulses, means responsive to the beginning of a half cycle of binary coded pulse waveform signal for starting the counter, means responsive to the end of a half cycle of received signal for stopping the counter, and comparator means for determining whether the count of clock pulses during each enabled period is greater or less than a predetermined count corresponding to a time duration greater than the half time of the higher frequency and less than the half time of the lower frequency.

2. In a frequency shift keying data transmission system for transmission of information in a binary coded pulse waveform in which the mark of the binary coded pulse waveform is represented by a half cycle of a first keying frequency and the space is represented by a half cycle of a second keying frequency, the improvement comprising: means for the transmission of a signal of an approximately sinusoidal waveform having a phase continuous at the transitions of the sinusoidal waveform and wherein the time lengths of the mark and space symbols thereof are matched to the half time periods of the respective keying frequencies and the slope of said sinusoidal waveform is constant at the cross-over points; means for storing said binary coded pulse waveform, means for converting the binary coded pulse waveform into a matched waveform in which the time lengths of the mark and space symbols thereof are matched to the half time periods of the respective keying frequencies, filter means coupled to said converting means producing, from the matched waveform, said approximate sinusoidal waveform; said storage means being a data register having an input to which the binary coded pulse waveform is fed, and an output; clock means coupled to said data register such that the coded waveform is fed under the control of pulses from said clock means one bit at a time to a first shift register and, additionally, through an inverter to a second shift register, wherein the number of stages in the first and second shift registers have the same relationship to each other as the relationship between the first and second keying frequencies; said clock means generating pulses for shifting each bit of the coded waveform through the first and second registers to an OR gate, the outputs of which are the coded information converted to a rectangular waveform in which the time lengths of the mark and space symbols thereof are matched to the half time periods of the respective keying frequencies.

3. In a frequency shift keying data transmission system for transmission of information in a binary coded pulse waveform in which the mark of the binary coded pulse waveform is represented by a half cycle of a first keying frequency and the space is represented by a half cycle of a second keying frequency, the improvement comprising: means for the transmission of a signal of an approximately sinusoidal waveform having the phase continuous at the transitions of the sinusoidal waveform and wherein the time lengths of the mark and space symbols thereof are matched to the half time periods of the respective keying frequencies and the slope of said sinusoidal waveform is constant at the cross-over points; means for measuring the time duration between the cross-over points of the binary coded pulse waveform signal and comparing the time duration with a reference to determine whether the duration corresponds with that of the shorter half time of the higher keying frequency or that of the longer half time period of the lower keying frequency; clock means generating pulses are fed to a binary counter during the time interval of each half cycle, and the count obtained from said counter transferred to a first shift register, a second shift register containing a reference count, and comparator means coupled to said first and second shift registers to determine whether the count in said first shift register is greater than, less than, or equal to the reference count in the second shift register.

4. A data transmission system as claimed in claim 3, wherein the first and second shift registers are of the parallel in/serial out type.

5. A data transmission system as claimed in claim 3, wherein the first and second shift registers are of the parallel in /parallel out type.

6. In a frequency shift keying data transmission system for transmission of information in a binary coded pulse waveform in which the mark of the binary coded pulse waveform is represented by a half cycle of a first keying frequency and the space is represented by a half cycle of a second keying frequency, the improvement comprising: means for the transmission of a signal of an approximately sinusoidal waveform having a phase continuous at the transitions of the sinusoidal waveform and wherein the time lengths of the mark and space symbols thereof are matched to the half time periods of the respective keying frequencies and the slope of said sinusoidal waveform is constant at the cross-over points; means for storing said binary coded pulse waveform, means for converting the binary coded pulse waveform into a matched waveform in which the time lengths of the mark and space symbols thereof are matched to the half time periods of the respective keying frequencies, filter means coupled to said converting means producing, from the matched waveform, said approximate sinusoidal waveform, said storage means comprising a data register having an input to which the binary coded pulse waveform is fed and an output; clock means coupled to said data register such that the binary coded pulse waveform is fed from said data register under the control of pulses from said clock means; a shift register having an input and a plurality of stages of which at least two stages provide respective outputs, means for actuating one of the outputs when the binary coded bit is a mark and for actuating another of the outputs when the binary coded bit is a space, means for feeding clock pulses to the input of the shift register at the commencement of a mark or space bit and means for receiving the output of the actuating means and producing a rectangular wave output in which the time lengths of the mark and space symbols thereof are matched to the half time periods of the respective keying frequencies.

* * * * *